United States Patent Office 2,714,520
Patented Aug. 2, 1955

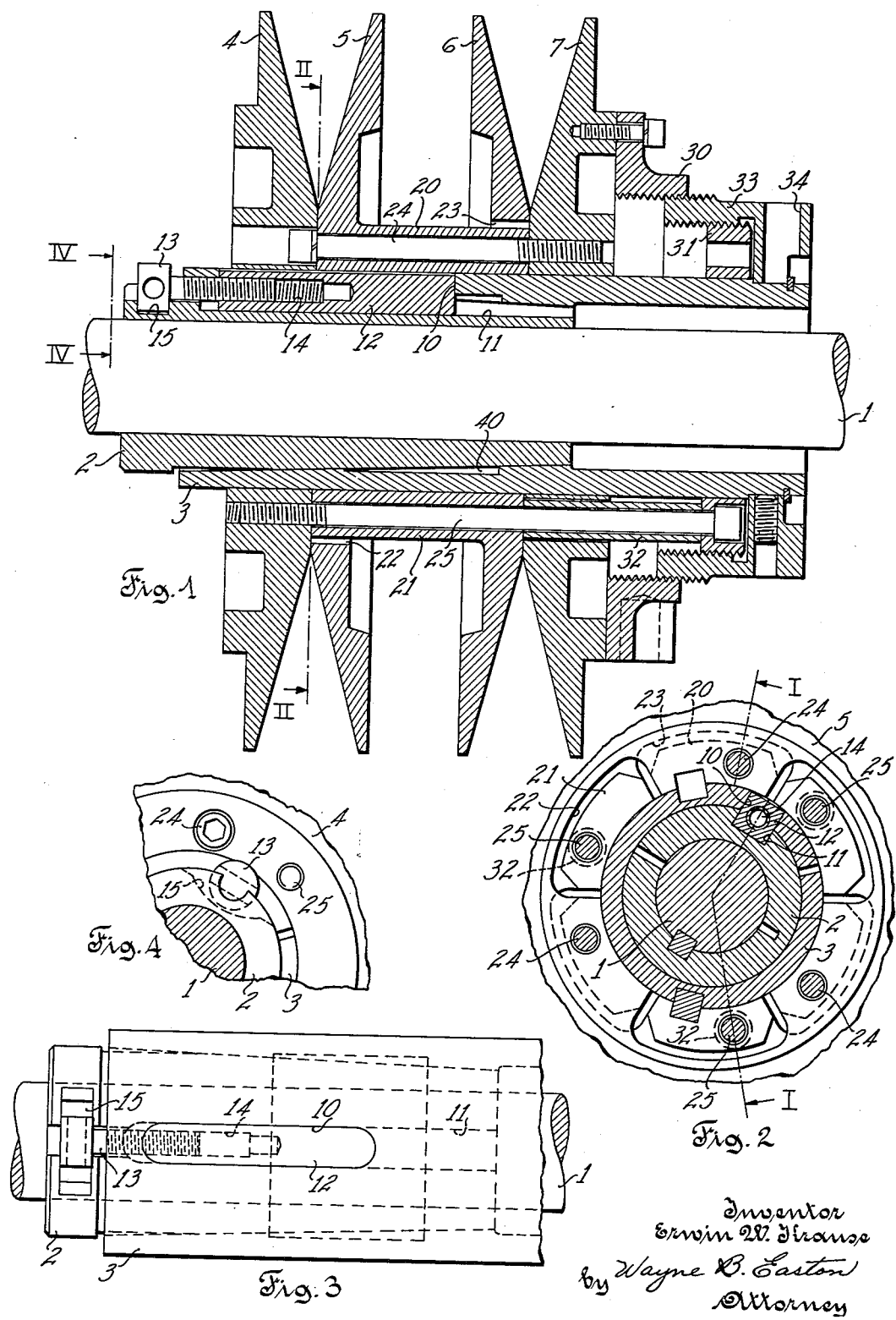

2,714,520

FASTENING DEVICE FOR SECURING MECHANICAL MEMBERS TO SHAFTS OR THE LIKE

Erwin W. Krause, Milwaukee, Wis., assignor to Allis-Chalmers Manufacturing Company, Milwaukee, Wis.

Application March 6, 1952, Serial No. 275,122

2 Claims. (Cl. 287—52.06)

The present invention relates to an improved fastening device for securing mechanical members such as pulleys, gears, sprockets, drives, couplings, etc., to shafts or the like.

Devices employing a member with a tapered bore or tapered external surface which cooperates with a tapered internal or external surface of a longitudinally split sleeve member for the purpose of clamping the sleeve member to another mechanical element, have long been known in the prior art. The clamping action of these devices involve forcibly moving the split sleeve member axially relative to the other member. Such devices are found in shaft and pipe couplings and in power transmitting connections for securing pulleys, gears, etc., in driving and driven relationship to shafts.

The present invention is concerned with an improvement in the means for forcibly moving the two respectively tapered members axially relative to one another.

More specifically, the means for forcibly moving the respectively tapered members involves a simple key and keyway arrangement in which a screw or other means cooperates with the key to effectively cause one or both of the members to clampingly engage another mechanical element such as a shaft or a pulley.

An object of the present invention is to provide a new and improved clamping device which is simple in construction and which is simple to operate.

Another object is to provide a new and improved clamping device which is inexpensive to manufacture and maintain and which is compact and economical of space.

Other objects will appear from the following description and drawing in which:

Fig. 1 is a view of a grooved pulley cooperating with the fastening means of the present invention, shown in section on a longitudinal plane through the axis of rotation taken on line I—I of Fig. 2;

Fig. 2 is a cross section taken on line II—II of Fig. 1;

Fig. 3 is a detail plan view of the pulley shown in Fig. 1 with the disks of the pulley removed to more clearly show the fastening means; and Fig. 4 is a fragmentary view, partially in section, taken on line IV—IV of Fig. 1.

In the drawing the fastening means embodying the present invention is shown by way of example as means for securing an adjustable diameter multiple groove pulley to a shaft 1 which may be either a driven or driving member. It is contemplated, however, that the fastening means may also be utilized for securing wheels of various types and other mechanical members to shafts.

The illustrated fastening means comprises an annularly shaped longitudinally split support member 2 having a cylindrical shaft engaging bore and an external tapered surface portion, and an annularly shaped longitudinally split hub member 3 having a tapered bore fitting the tapered surface portion of the support member 2 and a cylindrical external surface. Concentrically mounted on hub member 3 in slidable nonrotatable relation is a group of annularly shaped disks 4, 5, 6 and 7 which are provided with belt engaging surfaces to form a multiple groove pulley. Disks 4 and 6 are clamped together in axially spaced abutting relation to form a unitary set of disks and the alternate disks 5 and 7 are also clamped together in axially spaced abutting relation to form a second unitary set of disks. The two sets of disks are axially movable relative to each other and relative to hub member 3 so that the effective pitch diameter of the pulley may be varied.

When the sets of disks are moved to desired axial positions on hub member 3, by means described hereinafter, the fastening means functions to clampingly secure the sets of disks to shaft 1. This function is performed when hub member 3 is moved axially relative to support member 2 such that the longitudinally split support member 2 contracts radially to clampingly engage shaft 1 and the longitudinally split hub member 3 expands radially to clampingly engage the sets of disks.

The present invention is directed primarily to the providing of a novel key and keyway arrangement between support member 2 and hub member 3 to effect relative axial movement between these members. The keyway is jointly formed by and between members 2 and 3 and is defined by a longitudinally extending aperture 10 in hub member 3 and a longitudinally extending recess 11 in the exterior of support member 2. Recess 11 is radially aligned with aperture 10 and is longer in length. A key 12 substantially equal in length to the length of aperture 10 is disposed in the keyway so that it is carried axially by hub member 3 and is slidable in recess 11 for axial movement relative to support member 2. Means to effect axial movement of key 12 and hub member 3 relative to support member 2 is characterized by a rotatable actuating screw 13 which cooperates in threaded engagement with a threaded longitudinal bore 14 in key 12. A transverse slot 15 is provided in support member 2 in which a portion of the head of actuating screw 13 is disposed to anchor the screw axially. The head of actuating screw 13 is provided with a bore in which a rod (not shown) may be inserted to rotate the screw in either direction to effect clamping and unclamping of the sets of disks on shaft 1.

At this point it should be understood that certain of the parts associated with the key and keyway may be reversed within the scope of the invention. An example of such a reversal would be to make key 13 movable with support member 2 such that it moves relative to hub member 3. In such case the actuating screw 13 would be axially fixed with respect to hub member 3 instead of support member 2.

A known way of spacing and clamping the disks 4, 5, 6 and 7 to provide two unitary, relatively movable sets is illustrated in the drawing. Disks 5 and 6 are respectively formed with axially extending lugs 20 and 21 which are circumferentially spaced so that the lugs on each disk form an annular series. Between the respective lugs of disks 5 and 6 are openings 22 and 23 such that in assembly the set of lugs on each disk is interdigitated and passes through the openings between the set of lugs on the other disk. Suitable tie bolts 24 and 25 are passed through suitable holes in the lugs and end disk of their respective sets of disks and serve to clamp together the respective disks in each set.

Known means for axially moving the two sets of disks toward and away from each other to increase and decrease the effective pitch diameter of the pulley is illustrated in the drawing. The means include an internally threaded collar 30 concentrically secured to the rear surface of disk 7, and an externally oppositely threaded collar 31 of smaller diameter than collar 30 concentrically secured to disk 6 by means of tubular spacers 32 and tie bolts 25. An actuating collar 33 is rotatably mounted on hub member 3 and has an axially extending flange portion with external threads for threaded engagement with collar 30 and internal threads for threaded engagement with collar 31. Collar 33 is axially fixed with respect to hub member 3 such that upon rotation of collar 33 the respective sets of disks to which collars 30 and 31 are secured will slide in opposite axial directions. Collar 33 may be rotated with respect to hub member 3 by means of a rod (not shown) inserted in a bore 34 therein.

To provide for efficient clamping action hub member 3 is provided with a recess 40 formed axially between intermediate disks 5 and 6. The purpose of the recess is to permit uniform radial expansion of hub member 3 along a substantial portion of its axial length so as to cause the radial clamping forces to be concentrated and applied directly beneath each cooperating pair of disks.

The key and keyway arrangement illustrated in the drawing is susceptible of other embodiments within the scope of the present invention. One such embodiment is a construction in which hub member 3 is not split longitudinally and an annular pulley or wheel member is either secured to hub member 3 with ordinary set screws or is made integral with hub member 3. In such a construction the tapered bore of hub member 3 would still function to radially contract support member 2 on shaft 1 when the key arrangement causes relative axial movement between members 2 and 3.

Another embodiment is a construction in which support member 2 is not split longitudinally and is not necessarily annular in shape. In such a construction the tapered surface portion of support member 2 would still function to expand hub member 3 into clamping engagement with a disk or wheel mounted thereon when the key arrangement causes relative axial movement between members 2 and 3.

The invention also includes such other modifications and equivalents as may readily occur to those skilled in the art within the scope of the appended claims.

It is claimed and desired to secure by Letters Patent:

1. Fastening means for attaching a pulley or the like to a shaft, comprising: an annular longitudinally split support member having a shaft engaging bore and an externally tapered surface portion; a longitudinally split hub member having a cylindrical external surface and a tapered bore fitting said tapered surface portion; said members jointly defining a keyway between them which is formed by a longitudinally extending aperture in said hub member and a longitudinally extending recess in the exterior of said support member, said recess being of greater length than said aperture and radially aligned with said aperture; a key disposed in said keyway having a threaded longitudinal bore, the length of said key being the same as the length of said aperture such that it is axially movable with said hub member and axially movable relative to said support member; a rotatable actuating screw threadedly engaging said threaded bore of said key and being axially fixed relative to said support member; and means for rotating said screw to effect relative axial movement of said members whereby said support member contracts radially for clamping engagement with a shaft and said hub member expands radially for clamping engagement with a pulley or the like.

2. Fastening means for a pulley or the like, comprising, a support member having an external tapered surface portion, a hub member having a tapered bore fitting said tapered surface portion, said hub and said support members being formed so as to jointly define therebetween a longitudinally extending keyway, a key with a threaded longitudinal bore disposed in said keyway between the ends of said support member and between the ends of said hub member and connected to one of said members so as to be axially movable therewith and relatively movable with respect to the other one of said members, a rotatable actuating screw threadedly engaging said threaded bore and being axially fixed with respect to said other one of said members when said screw is rotated in either direction, and means for rotating said actuating screw in either direction to effect relative axial movement of said members for selectively causing said members to clampingly engage and to disengage from each other.

| | | |
|---|---|---|
| Re. 22,485 | Otto | May 23, 1944 |
| 333,376 | Yocom | Dec. 29, 1885 |
| 2,082,969 | Myers | June 8, 1937 |
| 2,465,471 | Packer | Mar. 29, 1949 |
| 2,487,225 | Dunne | Nov. 8, 1949 |
| 2,556,151 | Bremer | June 5, 1951 |
| 2,610,515 | Williams | Sept. 16, 1952 |